US009612781B2

United States Patent
Shinnae

(10) Patent No.: US 9,612,781 B2
(45) Date of Patent: Apr. 4, 2017

(54) PRINTING SYSTEM AND INFORMATION PROCESSING APPARATUS, METHOD, AND PROGRAM FOR CONTROLLING JOB TRANSMISSION BASED ON AUTHENTICATION SETTING OF AN IMAGE FORMING APPARATUS

(71) Applicant: CANON KABUSHIKI KAISHA, Tokyo (JP)

(72) Inventor: Toru Shinnae, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/751,932

(22) Filed: Jun. 26, 2015

(65) Prior Publication Data

US 2016/0004482 A1 Jan. 7, 2016

(30) Foreign Application Priority Data

Jul. 7, 2014 (JP) .................................. 2014-139875

(51) Int. Cl.
*G06F 3/12* (2006.01)
(52) U.S. Cl.
CPC ............ *G06F 3/122* (2013.01); *G06F 3/1221* (2013.01); *G06F 3/1222* (2013.01); *G06F 3/1229* (2013.01); *G06F 3/1238* (2013.01); *G06F 3/1285* (2013.01); *Y02B 60/1271* (2013.01)
(58) Field of Classification Search
None
See application file for complete search history.

(56) References Cited

U.S. PATENT DOCUMENTS

| 5,970,228 A | * | 10/1999 | Nezu ...................... G06F 21/608 |
| | | | 271/287 |
| 2003/0035124 A1 | * | 2/2003 | Tomita ............... G06K 15/1805 |
| | | | 358/1.8 |
| 2006/0028530 A1 | * | 2/2006 | Nishiyama ............ G06F 21/608 |
| | | | 347/153 |
| 2008/0304095 A1 | * | 12/2008 | Saito .................... G06K 15/005 |
| | | | 358/1.14 |

(Continued)

FOREIGN PATENT DOCUMENTS

JP 2013-156834 8/2013

OTHER PUBLICATIONS

U.S. Appl. No. 14/750,213, filed Jun. 25, 2015.

*Primary Examiner* — Fan Zhang
(74) *Attorney, Agent, or Firm* — Fitzpatrick, Cella, Harper & Scinto

(57) ABSTRACT

To prevent a printing apparatus from performing unnecessary processes, there is provided an image processing apparatus which is communicable with the printing apparatus and comprises: a determining unit configured to determine whether or not authentication information of the printing apparatus has been set in a print job; and a controlling unit configured to control to not transmit the print job to the printing apparatus in a case where it is determined by the determining unit that the authentication information has not been set in the print job, and control to transmit the print job to the printing apparatus in a case where it is determined by the determining unit that the authentication information has been set in the print job.

12 Claims, 12 Drawing Sheets

(56) References Cited

U.S. PATENT DOCUMENTS

2009/0033963 A1* 2/2009 Yamakawa .............. H04N 1/54
                                                    358/1.9
2009/0153895 A1* 6/2009 Hibino et al. ......... G06K 15/02
                                                    358/1.14
2014/0146365 A1* 5/2014 Hara .................. H04N 1/32432
                                                    358/1.15

* cited by examiner

PRINTING SYSTEM AND INFORMATION PROCESSING APPARATUS, METHOD, AND PROGRAM FOR CONTROLLING JOB TRANSMISSION BASED ON AUTHENTICATION SETTING OF AN IMAGE FORMING APPARATUS

BACKGROUND OF THE INVENTION

Field of the Invention

The present invention relates to a printing system which includes an image processing apparatus and a printing apparatus.

Description of the Related Art

Recently, a principal use case of a printing apparatus is to receive print jobs from a plurality of PC's (personal computers) connected via a network and perform printing based on information included in the received print jobs. In the use case like this, to improve security, a function of performing user authentication based on the password added to the print job, and then performing the print job only when the user authentication is successful but not performing the print job when the user authentication is not successful has been provided conventionally in the printing apparatus (Japanese Patent Application Laid-Open No. 2013-156834).

Here, for example, even in a case where an external device such as a print controller or the like is connected to the printing apparatus like this, it is of course necessary to perform the user authentication also to a print job transferred from the external device. That is, user information has to be added to the externally transferred print job, and thus the printing apparatus performs the print job only when the user authentication is successful.

When the print job is transferred from the print controller to the printing apparatus which performs the user authentication, the user information such as a user name, a password and the like is indispensable for the print job. However, in the conventional system in which the print job is transferred from a PC to the print controller, an RIP (raster image processor) process is performed by the print controller to generate image data, and the generated image data is transferred to and printed by the printing apparatus, the following operation is performed. That is, even in a case where the user authentication will not be successful obviously because the user information does not exist in the print job, the print controller inevitably transfers the relevant print job to the printing apparatus and thus the printing apparatus performs the user authentication. In other words, since the print controller transfers the print job not having the user information to the printing apparatus, the printing apparatus performs the essentially-unnecessary operations of receiving the print job, analyzing the received print job, and performing the user authentication based on the analyzed print job. Besides, in a case where the printing apparatus is in a power-saving state set by, e.g., a sleep function, the set power-saving state is released due to the above unnecessary operations, and the printing apparatus thus returns to the normal state to perform the user authentication, so that the power which should not be consumed essentially is consumed.

SUMMARY OF THE INVENTION

In order to prevent such problems as described above, the present invention provides a printing system which includes an image processing apparatus and a printing apparatus, wherein: the image processing apparatus comprises a determining unit configured to determine whether or not authentication information of the printing apparatus has been set in a print job, and a controlling unit configured to control to not transmit the print job to the printing apparatus in a case where it is determined by the determining unit that the authentication information has not been set in the print job, and control to transmit the print job to the printing apparatus in a case where it is determined by the determining unit that the authentication information has been set in the print job; and the printing apparatus comprises an authenticating unit configured to, when the print job is received from the image processing apparatus, perform authentication based on the authentication information set in the print job, and a performing unit configured to, in a case where the authentication by the authenticating unit is successful, perform printing of the print job.

Further features of the present invention will become apparent from the following description of exemplary embodiments with reference to the attached drawings.

DESCRIPTION OF THE EMBODIMENTS

Hereinafter, preferred embodiments of the present invention will be described with reference to the attached drawings.

<<First Embodiment>>

>Configuration of Printing System>

Figure 1:
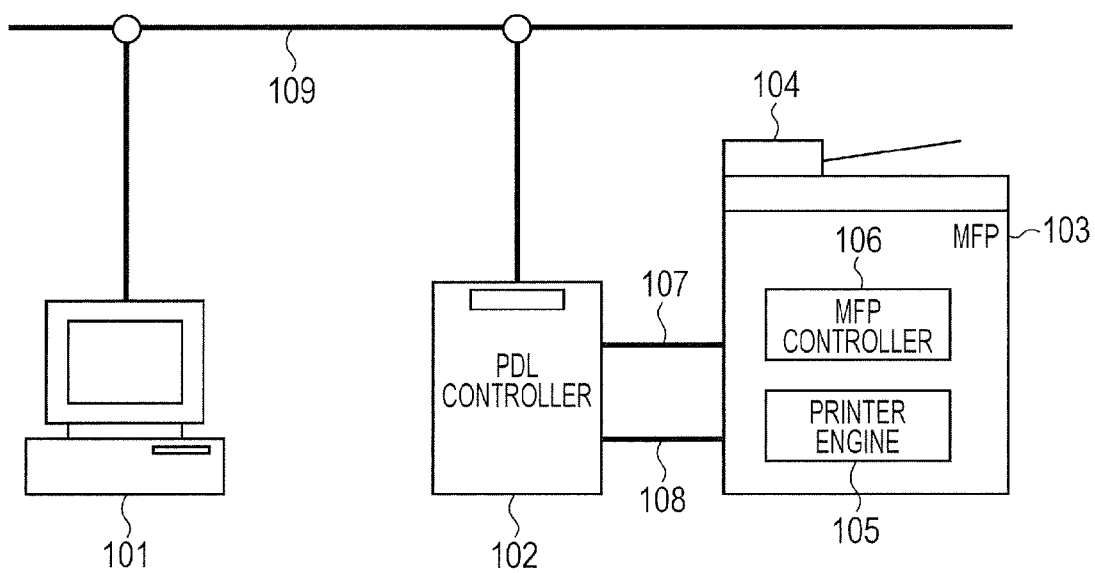
FIG. 1 is a diagram illustrating an example of the configuration of a printing system.

FIG. 1 is a diagram illustrating an example of the configuration of a printing system.

The CPU (central processing unit) of a client computer 101 performs various processes based on the programs stored in the memory and the like of the client computer, thereby achieving applications and printer driver of the client computer. A user instructs printing by an MFP 103 via a screen displayed on the display or the like of the client computer 101 by the printer driver. Here, although one client computer is included in the printing system of FIG. 1, a plurality of client computers may be included.

A PDL controller 102 generates image data from PDL data generated by the printer driver of the client computer 101. Here, the MFP 103 is used also as a printer for printing the image data generated by the PDL controller 102, and a copying machine. A scanner 104 is equipped with an automatic document feeder. The PDL controller 102 serves as an example of an image processing apparatus. The MFP 103 is equipped with an MFP controller 106 and a printer engine 105. The MFP controller 106 controls the MFP 103, and the printer engine 105 performs the printing under the control of the MFP controller 106.

The PDL controller 102 and the MFP 103 are communicably connected to each other by means of a local area network cable 107 through which a control signal for PDL printing flows and an image transfer video cable 108. The PDL controller 102 and the client computer 101 are connected to each other via a network 109.

<Hardware Constitutions of MFP and PDL Controller>

Figure 2:
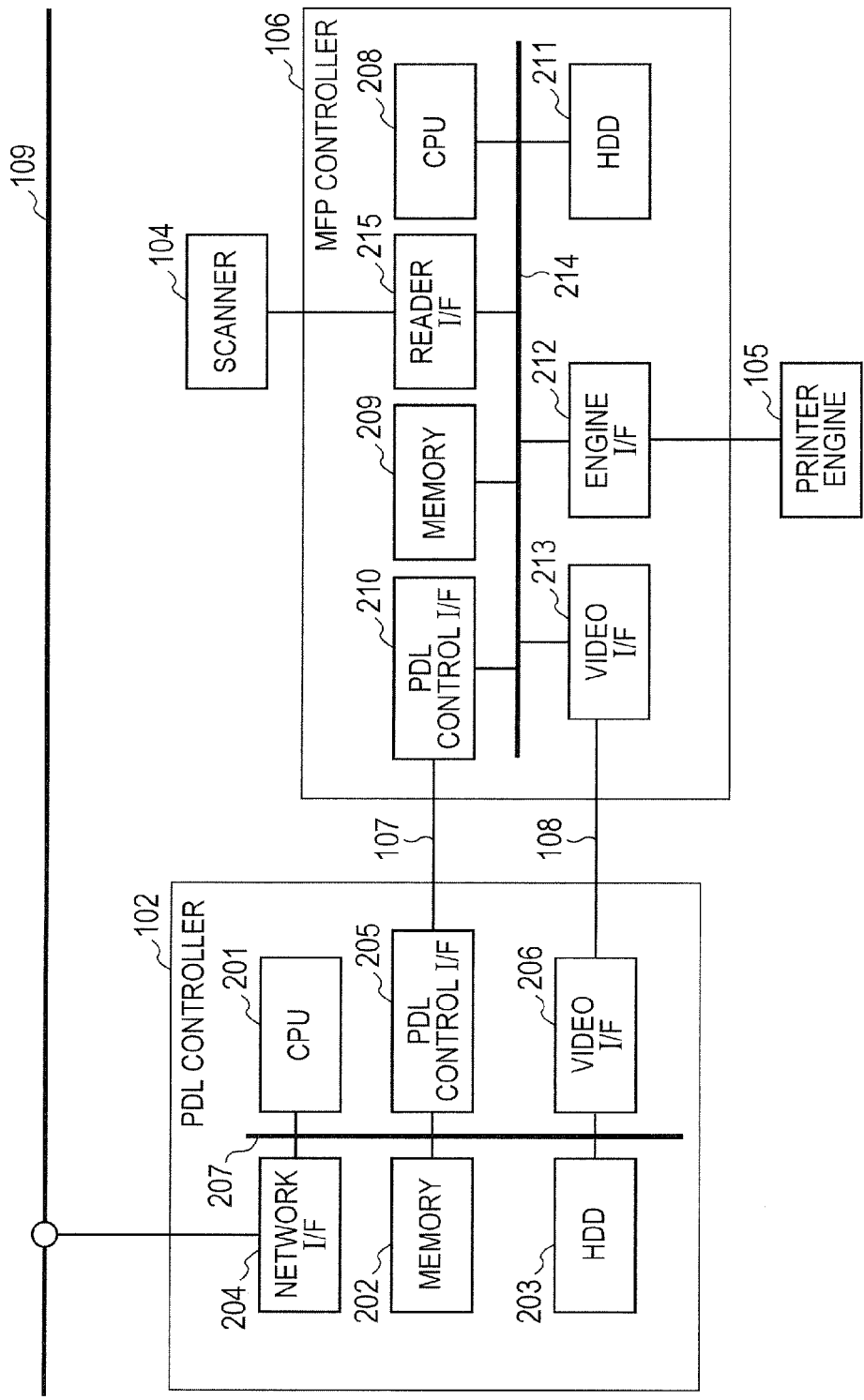
FIG. 2 is a diagram illustrating an example of the hardware constitutions of an MFP (multiple function peripheral) and a PDL (page description language) controller.

FIG. 2 is a diagram illustrating an example of the hardware constitutions of the MFP 103 and the PDL controller 102. The PDL controller 102 is equipped with a CPU 201, a memory 202, a HDD (hard disk drive) 203, a network I/F (interface) 204, a PDL control I/F 205 and a video I/F 206 which are mutually connected via a system bus 207. More specifically, the CPU 201 performs control and calculation in the PDL controller via the system bus 207, by executing the programs stored in a storage area. The memory 202 is used as a temporary storage area when the PDL data is decompressed into the image data. The HDD 203 is the storage device which stores therein the programs to be executed by the CPU 201. Also, the HDD 203 is used as a temporary storage or saving area for the data to be processed. Besides, authentication setting information to be used in a user authentication function of the MFP 103 is stored in the HDD 203. The network I/F 204 performs connection and communication with the client computer 101 via the network 109. The PDL control I/F 205 transmits/receives control commands to/from the MFP 103 via the local area network cable 107. The video I/F 206 transmits/receives image data to/from the MFP 103 via the image transfer video cable 108.

Under the condition that the CPU 201 performs the processes based on the programs stored in the memory 202 or the HDD 203, the software configuration of the PDL controller 102, the processes of the PDL controller 102, and the like are achieved.

In the MFP 103, the MFP controller 106 is equipped with a CPU 208, a memory 209, a PDL control I/F 210, an HDD 211, an engine I/F 212, a video I/F 213 and a reader I/F 215 which are mutually connected via a system bus 214. More specifically, the CPU 208 performs various control and calculation of the MFP 103 via the system bus 214, by executing the programs stored in a storage area. The memory 209 is used as a temporary storage area and a working memory while the printing apparatus is operating. The HDD 211 stores therein the programs to be executed by the CPU 208, and is also used as a temporary storage or saving area for the data to be processed. Besides, the authentication setting information to be used in the user authentication function of the MFP 103 is stored in the HDD 211.

The PDL control I/F 210 performs a PDL printing process to perform printing by the printer engine 105, and transmits/receives the control commands to/from the PDL controller 102 via the local area network cable 107. The video I/F 213 transmits/receives the image data to/from the PDL controller 102 via the image transfer video cable 108. The engine I/F 212 controls communication with the printer engine 105. The reader I/F 215 is connected to the scanner 104.

Under the condition that the CPU 208 performs the processes based on the programs stored in the memory 209 or the HDD 211, the software configuration of the MFP 103, the processes of the MFP 103, and the like are achieved.

Likewise, the client computer 101 comprises at least a CPU and memories such as a ROM (read-only memory), a RAM (random access memory), a HDD and the like, as the hardware constitutions. Then, under the condition that the CPU of the client computer 101 performs the processes based on the programs stored in the memory of the client computer 101, the software configurations of the client computer 101 are achieved.

<Print Job Routes and their Control in PDL Controller>

Figure 3:
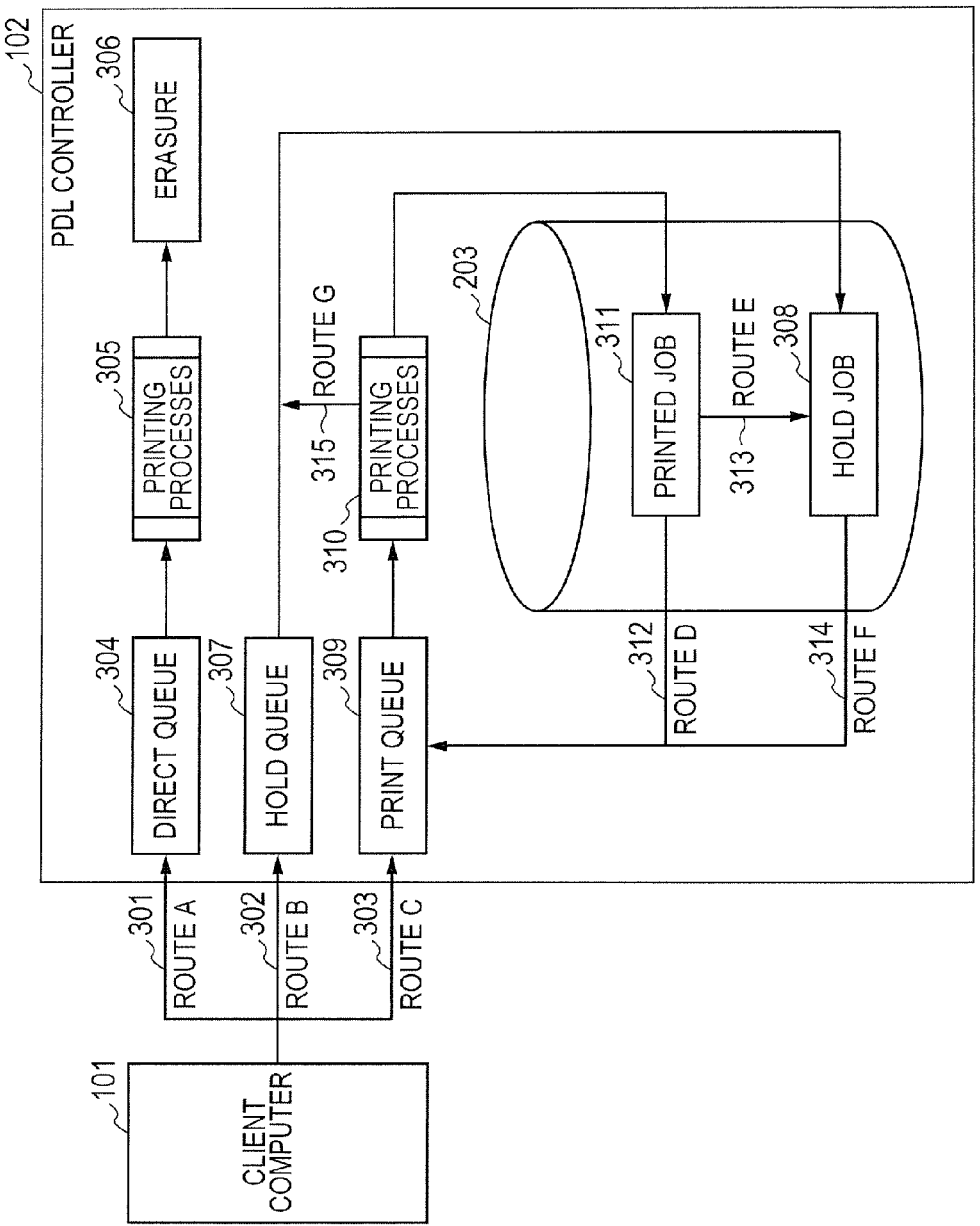
FIG. 3 is a diagram for describing print job routes and their control in the PDL controller.

FIG. 3 is a diagram for describing print job routes and their control in the PDL controller 102. In the PDL controller 102, a route A 301, a route B 302 and a route C 303 according to the control of processes are provided in regard to the print jobs transmitted from the client computer 101. The PDL controller 102 can edit and re-perform the print job saved in the HDD 203. That is, in the PDL controller 102, a route E 313, a route F 314 and a route G 315 according to the control of processes of the print job are provided. Incidentally, the print jobs saved in the HDD 203 are classified into two states, that is, a printed job (i.e., a print job for which printing has been completed) 311 and a hold job 308. Here, print attribute information included in the print job saved as the printed job 311 cannot be edited, whereas the print job saved as the hold job 308 can be edited.

The route A 301 indicates the route and control of the printing process to be performed when the print job is transmitted from the client computer 101 to a direct queue 304. Here, it should be noted that the direct queue 304 is the queue by which the PDL controller 102 receives the print job from the client computer 101, and erases the received print job after completing a series of processes to the relevant print job. That is, the direct queue is one of the process routes of the print job and its control. Therefore, the PDL controller 102 receives the print job from the client computer 101 by the direct queue 304, and erases (306) the received print job after completing a series of printing processes 305. Incidentally, it should be noted that the erasure 306 is the operation of erasing the data concerning the print job temporarily stored in the HDD 203 in the course of the series of printing processes 305, and the predefined process indicated by the printing processes 305 is the series of processes from the performance of the print job in the PDL controller 102 to the end of the printing in the MFP 103.

The route B 302 indicates the route and control of the printing process to be performed when the print job is transmitted from the client computer 101 to a hold queue 307. Here, it should be noted that the hold queue 307 is the queue by which the PDL controller 102 receives the print job from the client computer 101, and stores the received print job as the hold job 308 in the HDD 203 of the PDL controller 102 without performing printing at least in the MFP 103. That is, the hold queue is one of the process routes of the print job and its control. Therefore, the PDL controller 102 receives the print job from the client computer 101 by the hold queue 307, and saves the received print job as the hold job 308 in the HDD 203 without performing a series of printing processes. Incidentally, as another example of the process by the hold queue 307, it is possible to perform the image process such as the RIP process or the like and then save the print job as the hold job 308 together with the raster data being the print image data in the HDD 203.

The route C 303 indicates the route and control of the printing process to be performed when the print job is transmitted from the client computer 101 to a print queue 309. Here, it should be noted that the print queue 309 is the queue by which the PDL controller 102 receives the print job from the client computer 101, and stores the received print job as the printed job 311 in the HDD 203 of the PDL controller 102 after completing a series of processes to the relevant print job. That is, the print queue is one of the process routes of the print job and its control. Therefore, the PDL controller 102 receives the print job from the client computer 101 by the print queue 309, and saves the received print job as the printed job 311 in the HDD 203 after completing a series of printing processes 310.

Incidentally, it should be noted that the predefined process indicated by the printing processes 310 is the series of processes from the performance of the print job in the PDL controller 102 to the end of the printing in the MFP 103. In the printing processes 310, in the case where the user authentication function of the MFP 103 is enabled, if an error occurs in the print job not having user information, it is selected whether or not to save the print job as the hold job 308 in the HDD 203 via the later-described route G 315, and then the selected result is performed.

A route D 312 indicates the route and control of the process of re-performing the print job saved as the printed job 311 in the HDD 203. Therefore, if the print job which is the printed job 311 is re-performed, the PDL controller 102 receives the print job by the print queue 309, completes the series of printing processes 310, and then saves again the relevant print job as the printed job 311 in the HDD 203. In this case, the print attribute information which is included in the print job being the printed job 311 is the information at the point of time when the relevant print job is saved, and the print job is re-performed as it is. If the print attribute information is changed and the corresponding print job is re-performed, the later-described routes E 313 and F 314 are necessary.

The route E 313 indicates the route and control of the process of transitioning the state saved as the printed job 311 in the HDD 203 to the state of the hold job 308. Therefore, if the state transition operation to the hold job 308 is performed to the print job being the printed job 311, the PDL controller 102 again saves the relevant print job as the hold job 308 in the HDD 203. Incidentally, only after the print job is saved as the hold job 308, it is possible to change the print attribute information included in the relevant print job.

The route F 314 indicates the route and control of the process of re-performing the print job saved as the hold job 308 in the HDD 203. Therefore, if the print job which is the hold job 308 is re-performed, the PDL controller 102 receives the print job by the print queue 309, completes the series of printing processes 310, and then saves again the relevant print job as the printed job 311 in the HDD 203. Incidentally, if the print attribute information which is included in the print job saved as the hold job 308 is changed and then the relevant print job is re-performed, the series of printing processes 310 is performed based on the changed print attribute information.

The route G 315 indicates, in the print job executed by the print queue, the route and control of the process of saving the relevant print job as the hold job 308 in the HDD 203 in a case where user information does not exist in the relevant print job when the user authentication function of the MFP 103 is enabled.

<Reflection of Authentication Setting Information of MFP on PDL Controller>

Figure 4:
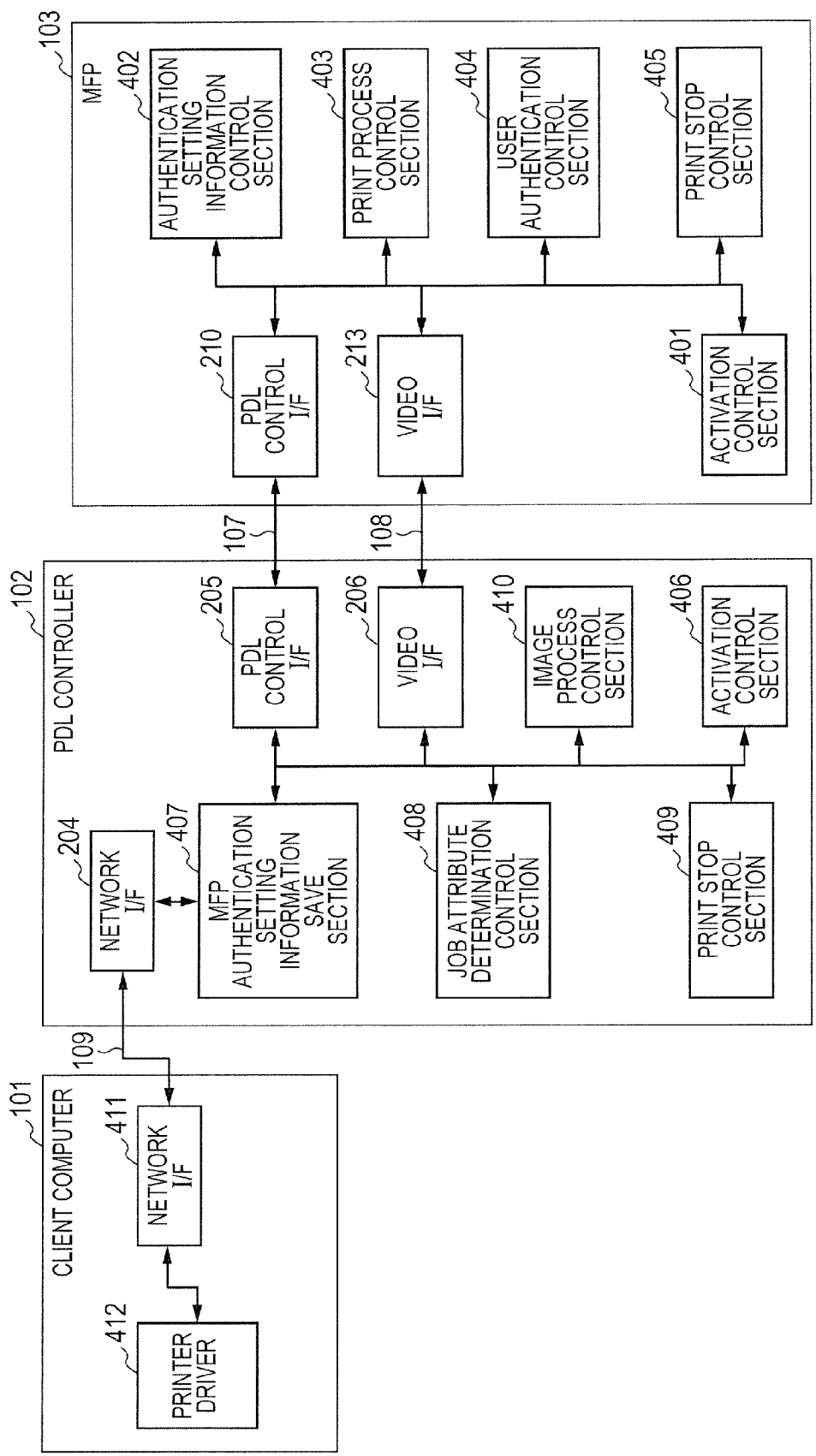
FIG. 4 is a diagram illustrating an example of the software configurations of the printing system.

Hereinafter, a process by which the PDL controller 102 determines the authentication setting information of the user authentication function of the MFP 103 will be described with reference to FIGS. 4 and 5. More specifically, FIG. 4 is the diagram illustrating an example of the software configurations of the printing system. In FIG. 4, an activation control section 401, an authentication setting information control section 402, a print process control section 403, a user authentication control section 404 and a print stop control section 405 are the software configurations of the MFP 103. Besides, an activation control section 406, an MFP authentication setting information save section 407, a job attribute determination control section 408, a print stop control section 409 and an image process control section 410 are the software configurations of the PDL controller 102. Moreover, the client computer 101, which is connected to the PDL controller 102 via a network I/F 411, includes a printer driver 412 as the software configuration.

Figure 5:
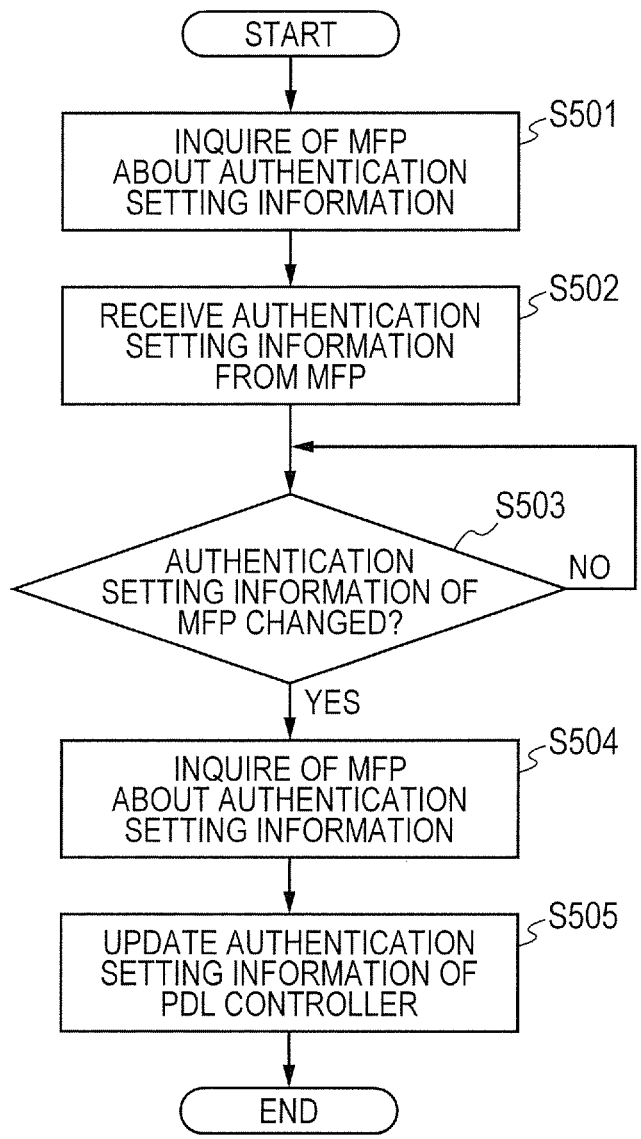
FIG. 5 is a flow chart indicating a process of determining whether user authentication is valid.

FIG. 5 is the flow chart indicating an example of the information process of determining, by the PDL controller 102, whether or not the user authentication of the MFP 103 is valid.

In FIG. 5, when it is powered on, the MFP 103 is activated by the activation control section 401. Likewise, when it is powered on, the PDL controller 102 is activated by the activation control section 406.

In S501, the MFP authentication setting information save section 407 inquires of the MFP 103 about whether or not the user authentication function of the MFP 103 is enabled when the PDL controller 102 is activated. More specifically, the MFP authentication setting information save section 407 makes the inquiry to the MFP 103 from the PDL control I/F 205 via the local area network cable 107.

In regard to the inquiry, in S502, the authentication setting information control section 402 transmits the authentication setting information of the user authentication function of the MFP 103 stored in the memory 209 from the PDL control I/F 210 to the PDL controller 102 via the local area network cable 107. Then, the MFP authentication setting information save section 407 stores the received authentication setting information of the user authentication function in the memory 202 of the PDL controller 102. By the authentication setting information, the PDL controller 102 can confirm whether or not the user authentication function of the MFP 103 is enabled.

Then, in S503, the authentication setting information control section 402 determines whether or not the authentication setting information of the user authentication function of the MFP 103 is updated (or changed) after the activation. If it is determined that the authentication setting information is updated, then the authentication setting information control section 402 transmits, to the PDL controller 102, update notification information indicating that the authentication setting information of the user authentication function of the MFP 103 has been updated. More specifically, the authentication setting information control section 402 transmits the update notification information to the PDL controller 102 by using the local area network cable 107 of the PDL control I/F 210 of the MFP 103. If the update notification information is received by the PDL controller 102, the process is advanced to S504 to update the authentication setting information of the user authentication function.

In S504, the MFP authentication setting information save section 407 inquires of the MFP 103 about the latest version of the authentication setting information of the user authentication function of the MFP 103, from the PDL control I/F 205 via the local area network cable 107. If the inquiry is received, the authentication setting information control section 402 transmits the latest authentication setting information from the PDL control I/F 210 of the MFP 103 to the PDL controller 102 via the local area network cable 107.

In S505, the MFP authentication setting information save section 407 stores the received latest authentication setting information in the memory 202, and updates the authentication setting information of the user authentication function. On the other hand, if it is determined in S503 that the authentication setting information of the user authentication function of the MFP 103 is not changed, the authentication setting information control section 402 repeats the process until the change of the authentication setting information is confirmed.

<Printing of Job Stored in PDL Controller>

The PDL controller 102 is provided with the function capable of performing printing by storing the print job transmitted from the client computer 101 by the hold queue 307 in the HDD 203 thereof and selecting the stored print job. Therefore, when it is intended to perform the printing from the print job stored in the HDD 203 of the PDL controller 102, it is necessary to confirm user information such as a user name, a password and the like.

Hereinafter, the information process to be performed by the printing system when the printing of the job saved in the HDD 203 of the PDL controller 102 is performed will be described with reference to FIGS. 6, 7 and 8. That is, FIG. 6 is the diagram illustrating a screen of a job management application for managing the job of the PDL controller 102, FIG. 7 is the flow chart indicating the information process for the print job of the printing system, and FIG. 8 is the flow chart indicating the information process to be performed in the MFP 103 having the user authentication function when the print job is transmitted from the PDL controller 102.

Figure 6:
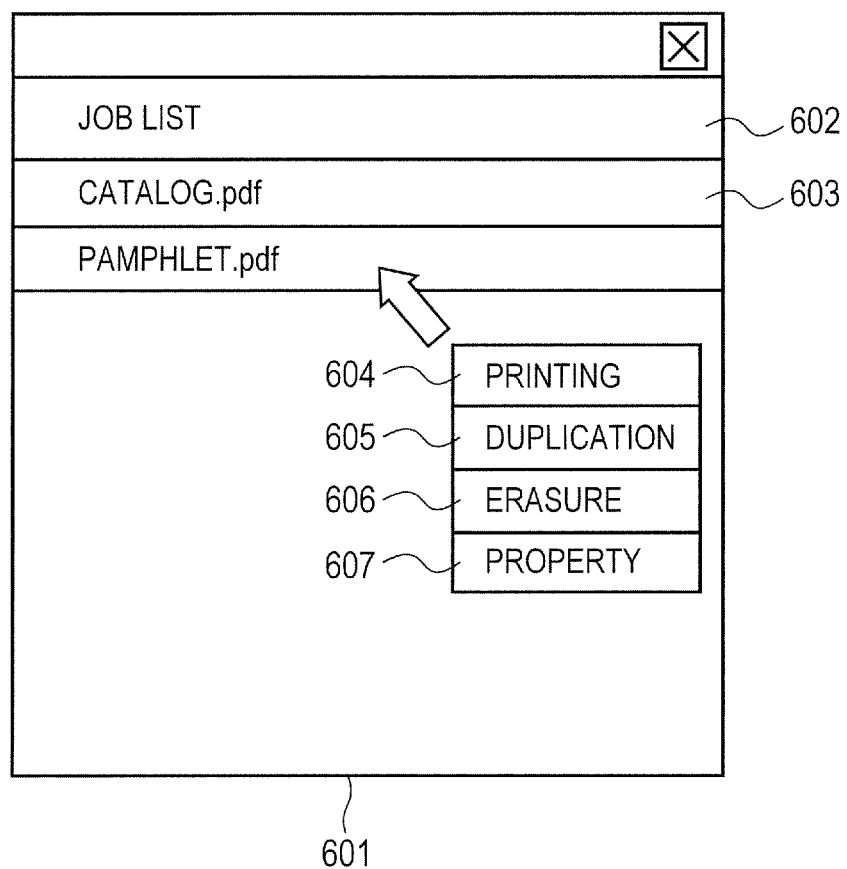
FIG. 6 is a diagram illustrating a screen of a job management application.

The arrangements and functions illustrated in FIG. 6 are as follows. That is, a screen 601 is the screen of the job management application. The job management application is one of the dedicated utilities of the PDL controller 102, which operates in the client computer 101. A job list menu 602 is the menu for list-displaying the jobs saved in the HDD 203 of the PDL controller 102. If the job list menu 602 is selected, the job management application obtains and displays the list of the jobs saved in the PDL controller 102. A job 603 indicates one of the list-displayed jobs. Menus 604 to 607 are the menus to be displayed when the job 603 in the job list is selected. More specifically, the menu 604 is the menu indicating printing. If the menu 604 is selected, the printing of the currently selected job 603 is instructed. The menu 605 is the menu indicating duplication. If the menu 605 is selected, the duplicate of the job currently selected on the screen 601 is formed in the HDD 203 of the PDL controller 102. The menu 606 is the menu indicating erasure. If the menu 606 is selected, the job currently selected on the screen 601 is erased from the HDD 203 of the PDL controller 102. The menu 607 is the property menu. If the menu 607 is selected, the properties such as the print information and the like of the selected job are displayed.

The job management application notifies the PDL controller 102 of the information indicating, e.g., which menu or the like has been selected on the screen 601. The PDL controller 102 prints and duplicates the hold job on the basis of the notified information.

Figure 7:
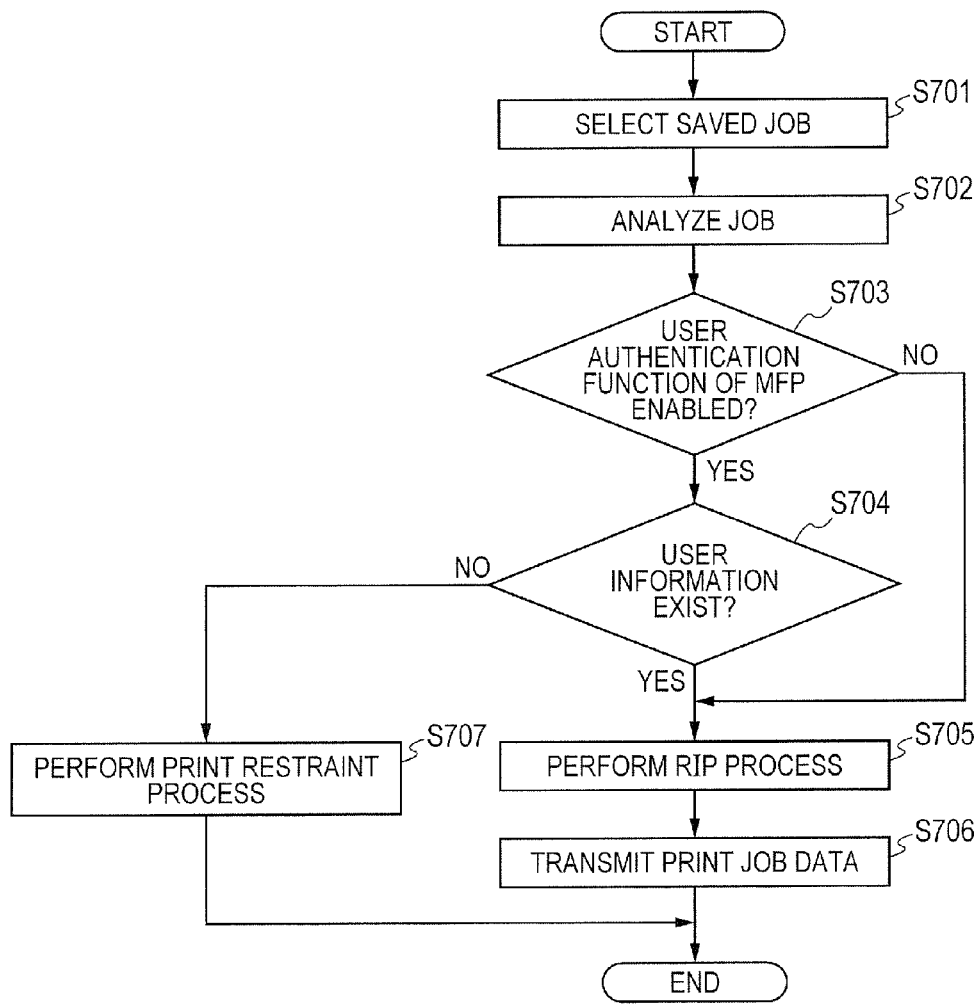
FIG. 7 is a flow chart indicating an information process for a print job of the printing system.
Figure 8:
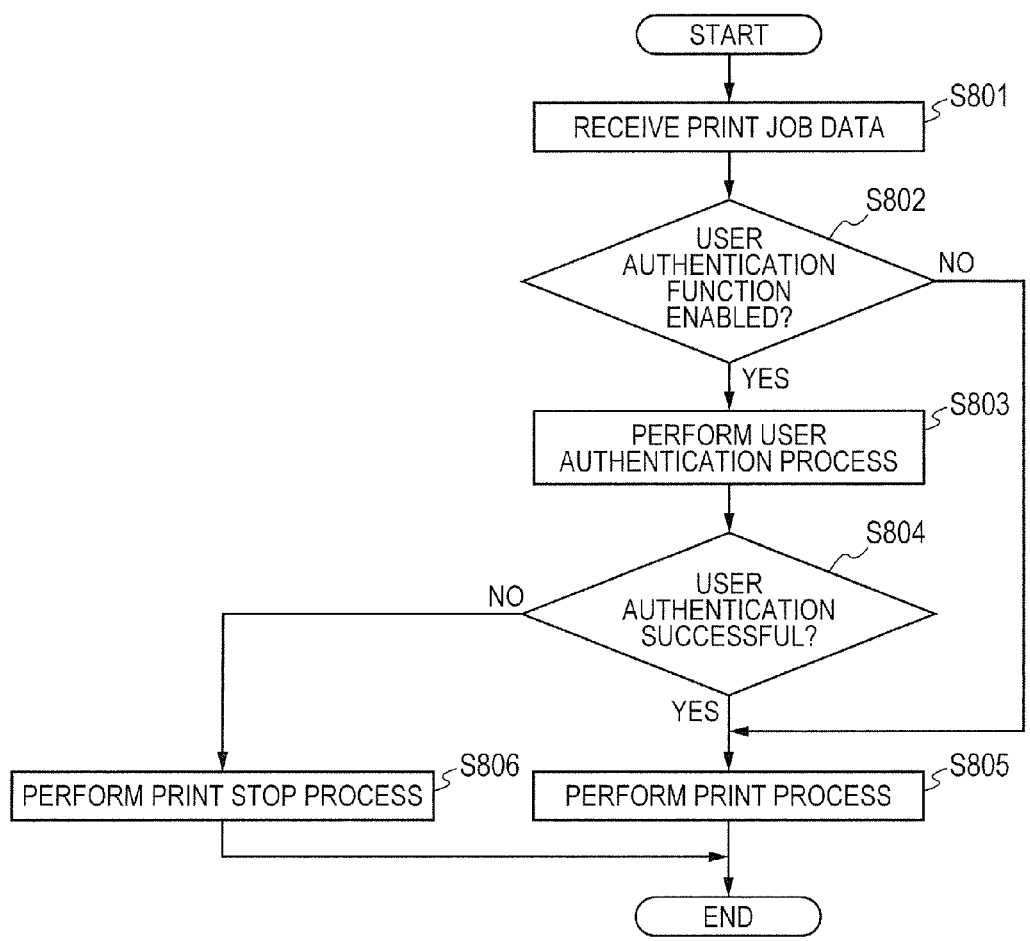
FIG. 8 is a flow chart indicating a process to be performed when the print job is transmitted.

In the flow chart of FIG. 7, in S701, the job attribute determination control section 408 selects the print job selected by a user from the list of the print jobs saved in the HDD 203 of the PDL controller 102, based on the information from the job management application. In S702, the job attribute determination control section 408 analyzes the selected print job, and obtains the print image information and the print attribute information of the analyzed print job.

In S703, the MFP authentication setting information save section 407 calls the current authentication setting information of the user authentication function of the MFP 103 stored in the memory 202. Then, the MFP authentication setting information save section 407 determines based on the called authentication setting information whether or not the user authentication function of the MFP 103 is enabled. Here, it should be noted that the process in S703 is an example of the enablement determination process. If it is determined by the MFP authentication setting information save section 407 that the user authentication function of the MFP 103 is enabled, the process is advanced to S704. On the other hand, if it is determined that the user authentication function of the MFP 103 is not enabled, the process is advanced to S705.

In S704, the job attribute determination control section 408 determines whether or not the user information (user authentication information) such as the user name, the password and the like exists in the obtained print attribute information. Then, if it is determined by the job attribute determination control section 408 that the user information exists in the print attribute information, the process is advanced to S705. On the other hand, if it is determined that the user information does not exist in the print attribute information, the process is advanced to S707.

In S705, the image process control section 410 performs the RIP process to generate the image data based on the print image information and the print attribute information of the selected print job.

Next, in S706, the image process control section 410 transmits the generated image data and the print setting information including the print attribute information and the like to the MFP 103, as the print job data, via the PDL control I/F 205 and the video I/F 206. The generated image data is an example of the image data obtained after the image process.

On the other hand, in S707, the print stop control section 409 performs the process of stopping the process concerning the printing of the print job. For example, the print stop control section 409 disables from selecting and performing the menu 604 from the job management application. Here, the print stop control section 409 may display an error message such as "a user name or a password does not exist" on the job management application. Incidentally, when the PDL controller 102 is provided with a display device or the like, the print stop control section 409 may display the error message on the display device.

As just described, since the PDL controller 102 merely determines whether or not the user information exists, the MFP 103 performs the user authentication using the user information.

Subsequently, the flow of the information process in the MFP 103 will be described with reference to the flow chart illustrated in FIG. 8.

In S801, the MFP 103 receives the print job data transmitted from the PDL controller 102.

In S802, the authentication setting information control section 402 determines whether or not the user authentication function is enabled, on the basis of the authentication setting information. If it is determined by the authentication setting information control section 402 that the user authentication function is enabled, the process is advanced to S803. On the other hand, if it is determined that the user authentication function is not enabled, the process is advanced to S805.

In S803, the user authentication control section 404 performs a user authentication process of comparing the user information such as the user name, the password and the like in the print attribute information of the received print job with the user information saved in the HDD 211 of the MFP 103.

In S804, the user authentication control section 404 determines, as the result of the user authentication process, whether or not the user authentication is successful. If it is determined by the user authentication control section 404 that the user authentication is successful, the process is advanced to S805. On the other hand, if it is determined that the user authentication is not successful, the process is advanced to S806.

In S805, the print process control section 403 performs a print process by transferring a print process control instruction from the engine I/F 212 to the printer engine 105, according to the image data and the print setting information in the print job data. After the print process, the print job is saved as the printed job in the HDD 203 of the PDL controller 102.

In S806, the print stop control section 405 performs a process of stopping printing of the print job. In this case, for example, an indication showing that the print job cannot be performed is displayed on the operation panel or the like of the MFP 103.

According to the present embodiment, since the print job not having the user information is not transmitted from the PDL controller 102 to the MFP 103 when the user authentication function of the MFP 103 is enabled, it is possible to prevent the MFP 103 from performing unnecessary operations.

<<Second Embodiment>
<Printing from Client Computer>

In the first embodiment, the PDL controller 102 selects the print job saved as the hold job in the HDD 203 of the PDL controller 102 and performs the printing of the selected print job. Besides, in the PDL controller 102, there is a use case that the printing is performed from the printer driver 412 of the client computer 101 via the print queue 309. Also in this case, it is necessary for the PDL controller 102 to determine whether or not the user information such as the user name and the password exists in the print job of the print queue 309.

Figure 9:
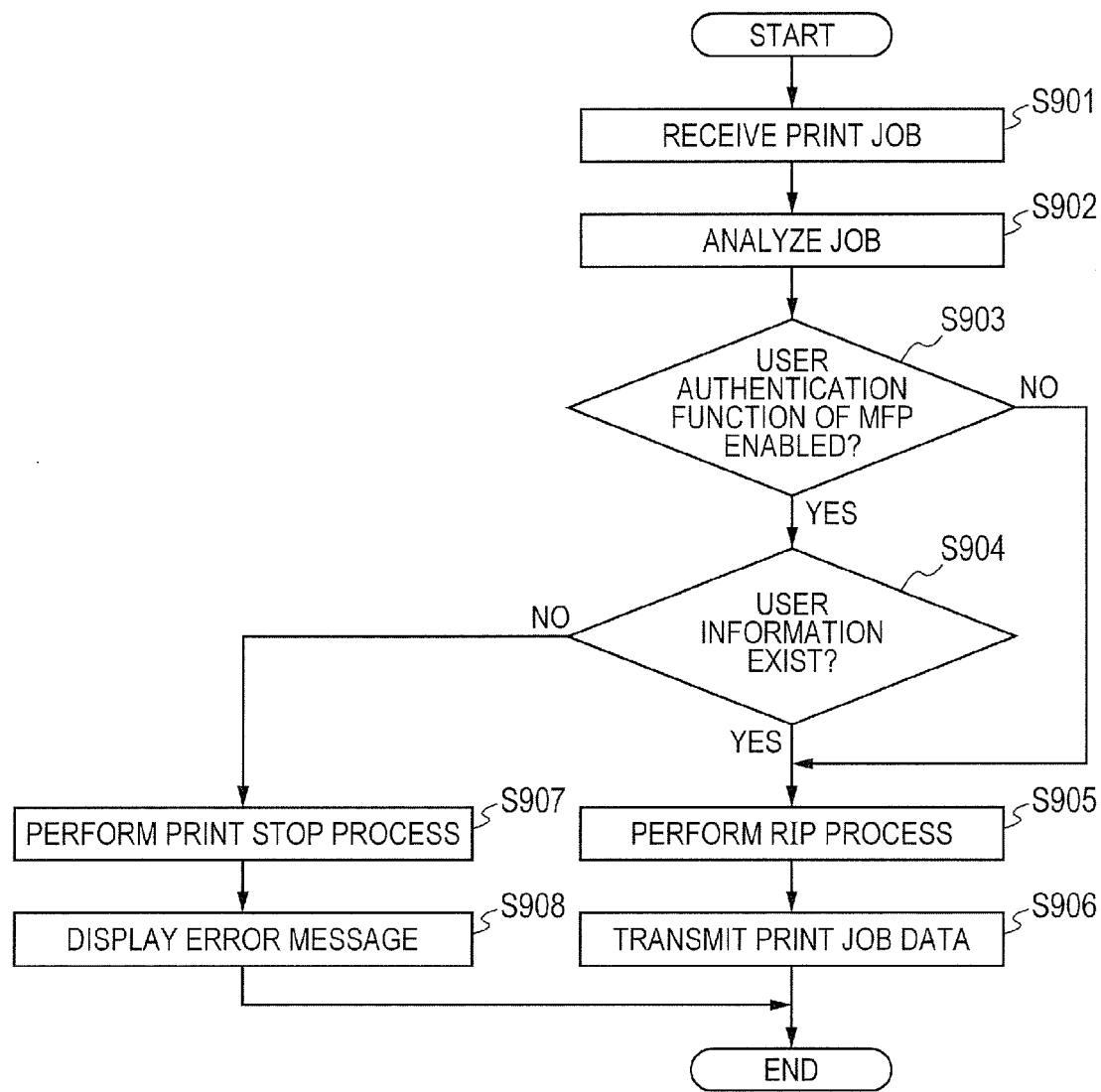
FIG. 9 is a flow chart indicating an information process for a print job of the printing system.

FIG. 9 is a flow chart indicating an information process for the print job of the printing system according to the second embodiment.

If the print job is transmitted from the client computer 101 by using the printer driver 412, in S901, the PDL controller 102 receives the transmitted print job and stores the received print job in the HDD 203.

Next, in S902, the job attribute determination control section 408 analyzes the print job, and thus obtains the print image information and the print attribute information of the analyzed print job.

In S903, the MFP authentication setting information save section 407 calls the current user authentication setting information of the MFP 103 stored in the memory 202, and determines whether or not the user authentication function of the MFP 103 is enabled. As the determination result, if it is determined by the MFP authentication setting information save section 407 that the user authentication function of the MFP 103 is enabled, the process is advanced to S904. On the other hand, if it is determined that the user authentication function of the MFP 103 is not enabled, the process is advanced to S905.

In S904, the job attribute determination control section 408 determines whether or not the user information such as the user name and the password exists in the print attribute information of the analyzed print job. Then, if it is determined by the job attribute determination control section 408 that the user information such as the user name and the password exists in the print attribute information, the process is advanced to S905. On the other hand, if it is determined that the user information such as the user name and the password does not exist in the print attribute information, the process is advanced to S907.

In S905, the image process control section 410 performs the RIP process to generate the image data based on the print image information and the print attribute information.

Next, in S906, the image process control section 410 transmits, as the print job data, the generated image data and the print setting information including the print attribute information and the like to the MFP 103 via the PDL control I/F 205 and the video I/F 206.

In S907, the print stop control section 409 performs the process of stopping the process of transmitting the print job to the MFP 103. The print stop control section 409 saves, as the printed job 311, the print job for which the transmission was stopped, in the HDD 203 of the PDL controller 102.

In S908, the print stop control section 409 transmits an error message such as "a user name or a password does not exist" to the client computer 101 to notify the user that the printing cannot be performed. Besides, when the PDL controller 102 is provided with a display unit or the like, the print stop control section 409 may control the display unit to display the error message.

Since the processes subsequent to the transmission of the print job having the user information to the MFP 103 are the same as those described in the first embodiment, the descriptions thereof will be omitted.

<<Third Embodiment>>
<Printing from Client Computer>

In the second embodiment, if the print job in which the user information does not exist is transmitted from the client computer 101, the print stop process is performed in the PDL controller 102 so that the received print job is not transmitted to the MFP 103 but is saved as the printed job 311 in the HDD 203. Since the print job for which the print stop process is performed in the PDL controller 102 does not have the user information, it is possible only by adding the user information to perform the printing of this print job. However, if the print stop process is performed in the PDL controller 102 and the print job is once saved as the printed job 311, it is impossible to re-edit the setting of this print job. For this reason, if it is intended to perform re-printing of the print job in which the user information does not exist and for which the print stop process was performed, the PDL controller 102 may save this print job as the hold job 308 in the HDD 203 so as to be able to add the user information.

Figure 10:
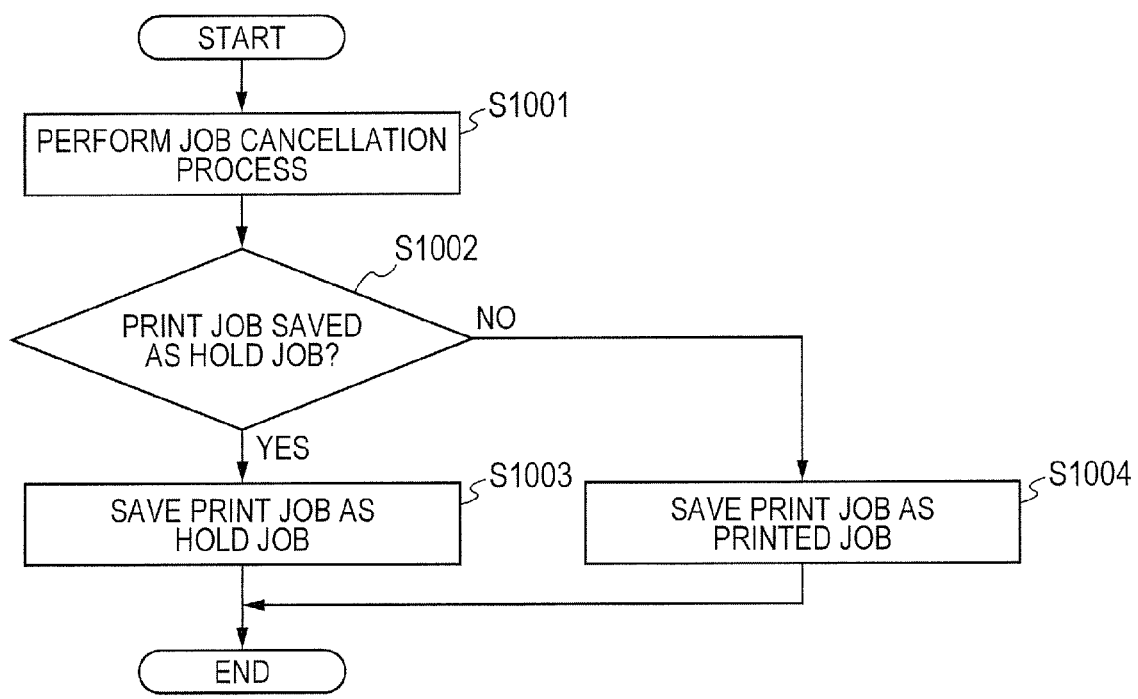
FIG. 10 is a flow chart indicating a process to be performed after a print stop process.

Hereinafter, a process of saving as the hold job 308 the print job for which the print stop process was performed in the PDL controller 102 will be described with reference to FIG. 10. That is, FIG. 10 is the flow chart indicating an example of the process to be performed after the print stop process was performed by the PDL controller 102.

In S1001, when the user authentication function of the MFP 103 is enabled and the user information does not exist in the print job transmitted from the client computer 101 to the PDL controller 102, the print stop control section 409 performs a job cancellation process. That is, the print stop control section 409 performs the process of stopping the PDL controller 102 from transmitting the print job to the MFP 103. The print stop control section 409 causes a user to select whether or not to save the print job as the hold job 308. For example, the print stop control section 409 causes the client computer 101 to display the selection screen for selecting whether or not to save the print job as the hold job 308. Then, the print stop control section 409 receives the selection information selected on the selection screen from the client computer 101.

In S1002, the print stop control section 409 determines whether or not to save the print job as the hold job, based on the selection information. For example, when the selection information indicates that "save as a hold job" has been selected on the selection screen, the print stop control section 409 determines that the print job should be saved as the hold job, and the process is advanced to S1003. On the other hand, when the selection information indicates that "do not save as a hold job" has been selected on the selection screen, the print stop control section 409 determines that the print job is not saved as the hold job, and the process is advanced to S1004. The process in S1002 is an example of the process of determining whether or not to save the print job as the hold job.

In S1003, the print stop control section 409 saves as the hold job 308 the print job subjected to the job cancellation process in the HDD 203 of the PDL controller 102, via the route G 315 illustrated in FIG. 3.

On the other hand, in S1004, the print stop control section 409 saves as the printed job 311 the print job subjected to the job cancellation process in the HDD 203 of the PDL controller 102.

If the print job for which the process of stopping the transmission from the PDL controller 102 to the MFP 103 was performed is saved as the hold job 308, firstly, it is possible to re-edit the setting of the hold job 308 saved in the HDD 203 of the PDL controller 102. Therefore, when the user authentication function of the MFP 103 is enabled, it is possible to perform the printing only by adding the user information to the current setting via the operation unit or the like of the client computer 101 or the PDL controller 102. That is, it is unnecessary to again perform the setting from the beginning.

Secondly, when the user authentication function of the MFP 103 has not been enabled, it is possible to re-perform printing of the hold job while keeping the current setting.

<<Fourth Embodiment>>
<Restraint of Printing by Printer Driver>

In the second and third embodiments, the print job is transmitted from the client computer 101 to the PDL controller 102 via the printer driver 412, and then the PDL controller 102 determines whether or not to cancel the job on the basis of the authentication setting information of the user authentication function of the MFP 103. However, when the authentication setting information of the user authentication function of the MFP 103 has been reflected in the PDL controller 102, the client computer 101 obtains the authentication setting information. Thus, the client computer 101 can restrain transmission of the print job to the PDL controller 102 via the printer driver 412 by using the obtained authentication setting information.

Figure 11:
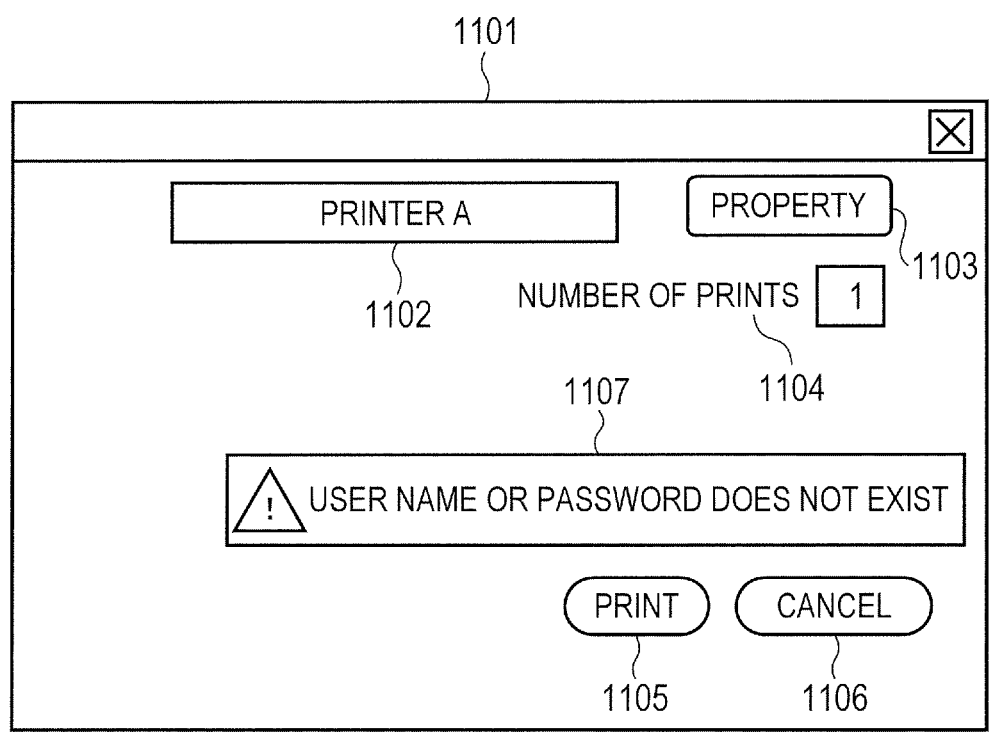
FIG. 11 is a diagram illustrating a screen of a printer driver.
Figure 12:
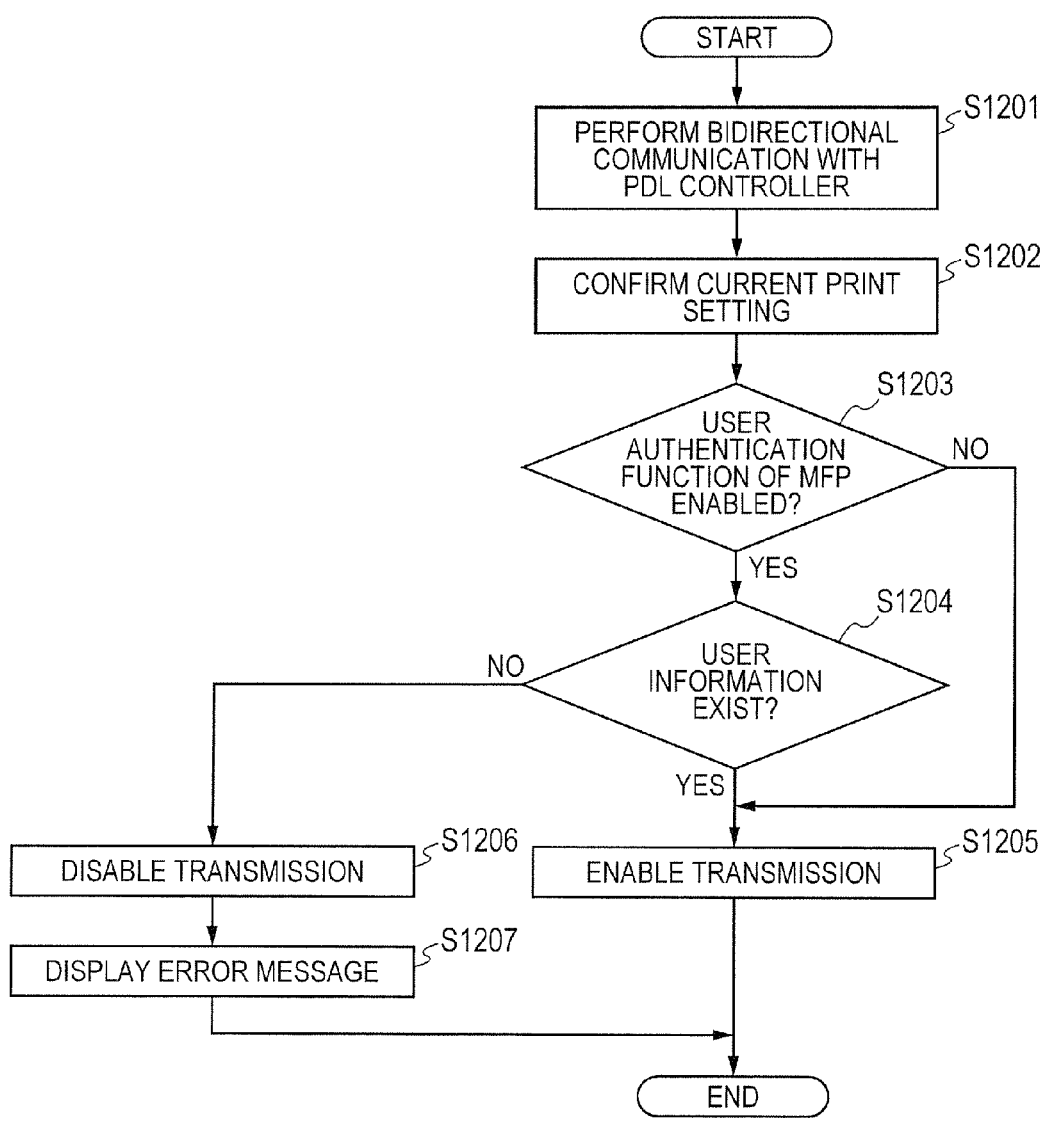
FIG. 12 is a flow chart indicating a process of restraining print job transmission.

Hereinafter, a process of restraining the transmission of the print job in the client computer 101 will be described with reference to FIGS. 11 and 12. More specifically, FIG. 11 is the diagram illustrating the screen of the printer driver 412 on the client computer 101, and FIG. 12 is the flow chart indicating an example of the process of restraining the transmission of the print job in the client computer 101 according to the present embodiment.

The screen of the printer driver on the client computer 101 will be described with reference to FIG. 11. A screen 1101 is the screen of the printer driver on the client computer 101. A display area 1102 is the portion showing the name of the MFP 103 to be used for the printing, and a button 1103 is the property button. When a user selects the button 1103 by operating the input device or the like of the client computer 101, the printer driver displays on the display the screen concerning the print setting of the MFP 103 used for the printing. An area 1104 is the area showing the number of prints, and a button 1105 is the print button. When a user selects the button 1105 by operating the input device or the like on the client computer 101, the current print setting is transmitted to the PDL controller 102 via the network 109. A button 1106 is the button for stopping the printing, and a message 1107 is the warning message to be displayed as popup in a case where the user information does not exist in the print job when the user authentication function of the MFP 103 is enabled.

Then, the process of restraining the transmission of the print job will be described with reference to the flow chart of FIG. 12. Initially, in response to a predetermined operation, the printer driver 412 causes the client computer 101 to display the screen 1101 on the display.

Next, in S1201, the printer driver 412 obtains the authentication setting information of the user authentication function of the MFP 103 from the MFP authentication setting information save section 407 of the PDL controller 102 via bidirectional communication with the PDL controller and reflects the obtained information.

Next, in S1202, the printer driver 412 confirms the current print setting information in the printer driver 412. When the print setting information has been set on the screen of the printer driver 412, the process is advanced to S1203.

In S1203, the printer driver 412 determines whether or not the user authentication function of the MFP 103 is enabled, based on the reflected authentication setting information. Then, if it is determined by the printer driver 412 that the user authentication function is enabled, the process is advanced to S1204. On the other hand, if it is determined that the user authentication function is not enabled, the process is advanced to S1205.

In S1204, the printer driver 412 determines whether or not the user information exists in the current print setting information. Then, if it is determined by the printer driver 412 that the user information exists, the process is advanced to S1205. On the other hand, if it is determined that the user information does not exist, the process is advanced to S1206.

In S1205, the printer driver 412 puts the button 1105 on the screen 1101 into a selectable state. Thus, if the button 1105 is selected, the printer driver 412 transmits the data (print job) currently intended to be printed to the PDL controller 102 via the network 109. Thus, the printer driver enables the transmission of the print job.

On the other hand, in S1206, the printer driver 412 puts the button 1105 on the screen 1101 into an unselectable state such as a grayout state or the like to perform a process of disabling the client computer from transmitting the print job to the PDL controller 102.

In S1207, the printer driver 412 displays the message 1107 as an error message to notify the user that the user information is lacking. In this case, the printer driver 412 enables the user to select the button 1105 after selecting the button 1103 and inputting the user information.

Since the processes subsequent to the transmission of the print job to the PDL controller 102 are the same as those described in the second embodiment, the descriptions thereof will be omitted.

As just described, it is possible to prevent the MFP 103 from performing unnecessary processes.

<<Other Embodiments>>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-139875, filed Jul. 7, 2014, which is hereby incorporated by reference herein in its entirety.

What is claimed is:

1. A printing system which includes an image processing apparatus and a printing apparatus,
    wherein the image processing apparatus comprises:
        a receiving unit configured to receive a print job transmitted from an information processing apparatus;
        a generating unit configured to generate image data based on image information included in the received print job; and
        a transmitting unit configured to transmit a print job data including the generated image data to the printing apparatus,
    wherein the printing apparatus comprises:
        an authentication unit configured to perform authentication based on authentication information included in the print job data transmitted from the image processing apparatus; and
        a printing unit configured to perform printing based on the generated image data included in the print job data according to success of the authentication, and
    wherein the image processing apparatus further comprises:
        a first determining unit configured to determine whether or not an authenticating function of the printing apparatus is enabled;
        a second determining unit configured to determine whether or not authentication information has been set in the print job transmitted from the information processing apparatus; and
        a controlling unit configured to control to:
            i) transmit the print job-data including the authentication information to the printing apparatus in a case where it is determined by the first determining unit that the authenticating function of the printing apparatus is enabled and it is determined by the second determining unit that the authentication information has been set in the print job,
            ii) not transmit the print job data to the printing apparatus in a case where it is determined by the first determining unit that the authenticating function of the printing apparatus is enabled and it is determined by the second determining unit that the authentication information has not been set in the print job, and
            iii) transmit the print job data to the printing apparatus irrespective of whether or not the authentication information has been set in the print job in a case where it is determined by the first determining unit that the authenticating function of the printing apparatus is not enabled.

2. An image processing apparatus which is communicable with a printing apparatus, comprising:
    a receiving unit configured to receive a print job transmitted from an information processing apparatus;
    a generating unit configured to generate image data based on image information included in the received print job;
    a transmitting unit configured to transmit a print job data including the generated image data to the printing apparatus;
    a first determining unit configured to determine whether or not an authenticating function of the printing apparatus is enabled;
    a second determining unit configured to determine whether or not authentication information has been set in the print job transmitted from the information processing apparatus; and
    a controlling unit configured to control to:
    i) transmit the print job data including the authentication information to the printing apparatus in a case where it is determined by the first determining unit that the authenticating function of the printing apparatus is enabled and it is determined by the second determining unit that the authentication information has been set in the print job,
    ii) not transmit the print job data to the printing apparatus in a case where it is determined by the first determining unit that the authenticating function of the printing apparatus is enabled and it is determined by the second determining unit that the authentication information has not been set in the print job, and
    iii) transmit the print job data to the printing apparatus irrespective of whether or not the authentication information has been set in the print job in a case where it is determined by the first determining unit that the authenticating function of the printing apparatus is not enabled, wherein the printing apparatus performs authentication based on the authentication information included in the print job transmitted from the image processing apparatus and performs printing based on the image data included in the print job data according to success of the authentication.

3. The image processing apparatus according to claim 2, further comprising:

an obtaining unit configured to obtain attribute information from the printing apparatus, wherein the first determining unit determines whether or not an authenticating function of the printing apparatus is enabled, based on the attribute information obtained by the obtaining unit, and wherein, in accordance with a determination by the first determining unit that the authenticating function of the printing apparatus is enabled, the second determining unit determines whether or not the authentication information has been set in the print job transmitted from the information processing apparatus.

4. The image processing apparatus according to claim 2, wherein, in the case of controlling to not transmit the print job to the printing apparatus, the controlling unit displays a message indicating a stop of the printing.

5. The image processing apparatus according to claim 2, wherein, in the case of controlling to not transmit the print job to the printing apparatus, the controlling unit determines whether or not to save the print job as a hold job according to setting information.

6. The image processing apparatus according to claim 5, wherein, in a case where it is determined to save the print job as the hold job, the controlling unit saves the print job as the hold job in a storage device, and in a case where it is determined to not save the print job as the hold job, the controlling unit saves the print job as a printed job in the storage device.

7. The image processing apparatus according to claim 2, wherein the controlling unit controls the generating unit to not generate the image data in the case where it is determined by the second determining unit that the authentication information has not been set in the print job.

8. The image processing apparatus according to claim 7, wherein the image information included in the print job transmitted from the information processing apparatus is PDL data, and wherein the generating unit generates the image data based on the PDL data.

9. The image processing apparatus according to claim 2, further comprising a storing unit configured to store the print job transmitted from the information processing apparatus, wherein the second determining unit determines whether or not the authentication information has been set in the print job which is selected from among print jobs stored by the storing unit.

10. An information method in a printing system including an image processing apparatus and a printing apparatus, the method comprising:

in the image processing apparatus,
receiving a print job transmitted from an information processing apparatus;
generating image data based on image information included in the received print job;

a first determining step of determining whether or not an authenticating function of the printing apparatus is enabled;

a second determining step of determining whether or not authentication information has been set in the print job transmitted from the information processing apparatus; and controlling to:

i) transmit the print job data including authentication information to the printing apparatus in a case where the first determining step determines that the authenticating function of the printing apparatus is enabled and it is determined by the second determining step that the authentication information has been set in the print job, ii) not transmit the print job data to the printing apparatus in a case where it is determined by the first determining step that the authenticating function of the printing apparatus is enabled and it is determined by the second determining step that the authentication information has not been set in the print job, and ii) transmit the print job data to the printing apparatus irrespective of whether or not the authentication information has been set in the print job in a case where it is determined by the first determining step that the authenticating function of the printing apparatus is not enabled, and in the printing apparatus, performing authentication based on the authentication information included in the print job data transmitted from the image processing apparatus; and performing printing based on the generated image data included in the print job data according to success of the authentication.

11. An information processing method performed by an image processing apparatus communicable with a printing apparatus, the method comprising:

receiving a print job transmitted from an information processing apparatus;

generating image data based on image information included in the received print job;

a first determining step of determining whether or not an authenticating function of the printing apparatus is enabled;

a second determining step of determining whether or not authentication information has been set in the print job transmitted from the information processing apparatus; and controlling to:

i) transmit the print job data including authentication information to the printing apparatus in a case where the first determining step determines that the authenticating function of the printing apparatus is enabled and it is determined by the second determining step that the authentication information has been set in the print job, ii) not transmit the print job data to the printing apparatus in a case where it is determined by the first determining step that the authenticating function of the printing apparatus is enabled and it is determined by the second determining step that the authentication information has not been set in the print job, and iii) transmit the print job data including the generated image data to the printing apparatus irrespective of whether or not the authentication information has been set in the print job in a case where it is determined by the first determining step that the authenticating function of the printing apparatus is not enabled, wherein the printing apparatus performs authentication based on the authentication information included in the print job data transmitted from the image processing apparatus, and performs printing based on the generated image data included in the print job data according to success of the authentication.

12. A non-transitory computer-readable storage medium which stores a program to be executed by a processor of an image processing apparatus communicable with a printing apparatus, the program comprising code to execute:

a reception step of receiving a print job transmitted from an information processing apparatus;

a generating step of generating image data based on image information included in the received print job;

a first determining step of determining whether or not an authenticating function of the printing apparatus is enabled;

a second determining step of determining whether or not authentication information has been set in the print job transmitted from the information processing apparatus; and a controlling step of controlling to:

i) transmit the print job data including authentication information to the printing apparatus in a case where the first determining step determines that the authenticating function of the printing apparatus is enabled and it is determined by the second determining step that the authentication information has been set in the print job, ii) not transmit the print job data to the printing apparatus in a case where it is determined in the first determining step that the authenticating function of the printing apparatus is enabled and it is determined in the second determining step that the authentication information has not been set in the print job, and iii) transmit the print job data including the generated image data to the printing apparatus irrespective of whether or not the authentication information has been set in the print job in a case where it is determined in the first determining step that the authenticating function of the printing apparatus is not enabled, wherein the printing apparatus performs authentication based on the authentication information included in the print job data transmitted from the image processing apparatus, and performs printing based on the generated image data included in the print job data according to success of the authentication.

* * * * *